C. H. SMOOT.
VEHICLE SUSPENSION.
APPLICATION FILED MAY 22, 1915.

1,158,575.

Patented Nov. 2, 1915.
2 SHEETS—SHEET 2.

WITNESSES:

INVENTOR
Charles H. Smoot

UNITED STATES PATENT OFFICE.

CHARLES H. SMOOT, OF NEW YORK, N. Y., ASSIGNOR TO RATEAU BATTU SMOOT COMPANY, OF NEW YORK, N. Y., A CORPORATION OF NEW YORK.

VEHICLE SUSPENSION.

1,158,575.  Specification of Letters Patent.  Patented Nov. 2, 1915.

Application filed May 22, 1915. Serial No. 29,732.

*To all whom it may concern:*

Be it known that I, CHARLES H. SMOOT, a citizen of the United States, whose post-office address is 90 West street, New York city and State, have invented certain new and useful Improvements in Vehicle Suspension, which improvements are fully set forth in the following specification.

My invention has for its object the provision of improved means by which a vehicle equipped with air springs may have as great a vertical motion as may be desired and at the same time is suspended in such a way that the rolling motion is comprised between the necessary predetermined limits.

The smoothness with which a vehicle travels and also the stability of a vehicle are essentially dependent on the action of the springs controlling the rolling motion. The vehicle body should return to its normal position, after having been displaced from it by a shock, as quickly as possible. It is necessary to maintain an upright position of the vehicle as much as possible and in order to do this quick return to normal position should be aimed at in the spring controlling the rolling motion. The vertical, or up and down motion, of the vehicle should be made much slower than the rolling motion. The spring action should, therefore, be much softer for vertical displacement of the vehicle body than is requisite to take care of the rolling motion. Vehicles equipped with air springs as they are installed today must use air springs stiff enough not to increase excessively the rolling motion of the vehicle. By means of my invention the air springs can be made as soft as desired, inasmuch as they have no action as regards rolling motion and only come into play to soften the up and down motion of the vehicle.

Figure 1:
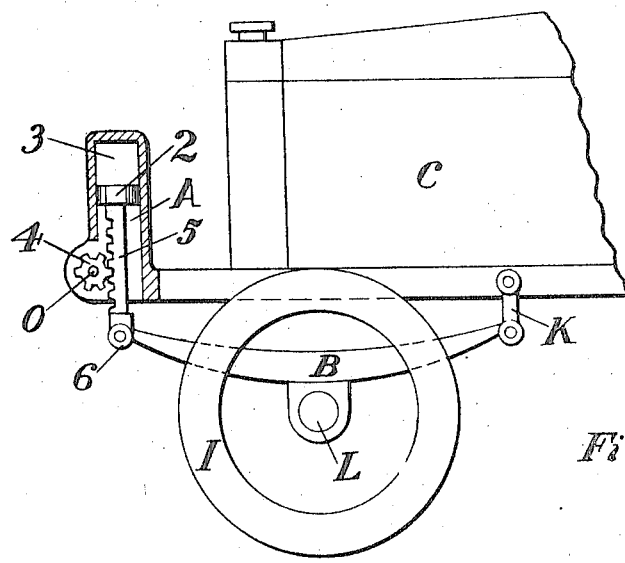
Figure 2:
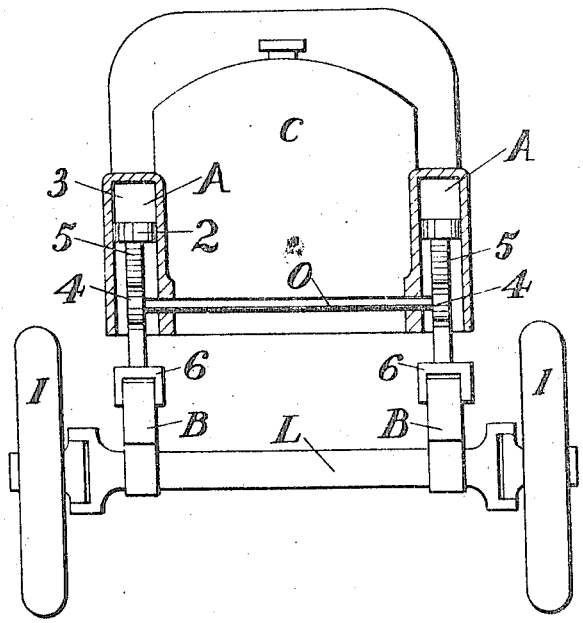
Figure 3:
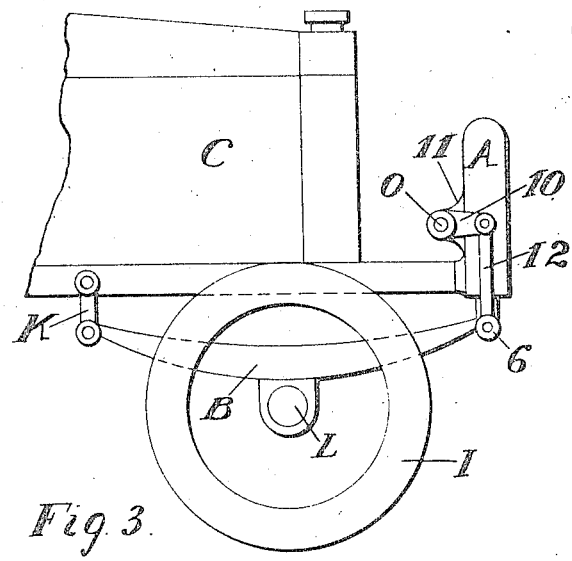
Figure 4:
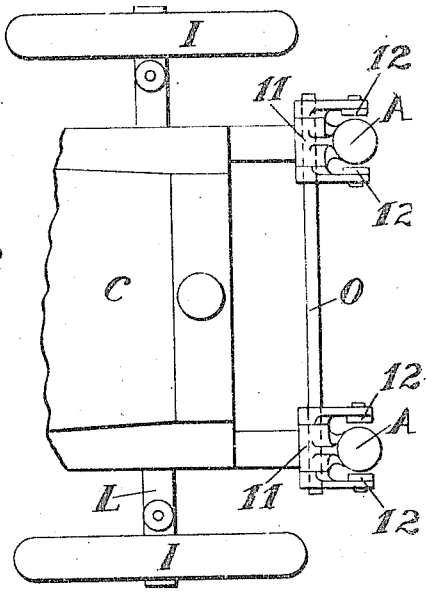
Figure 5:
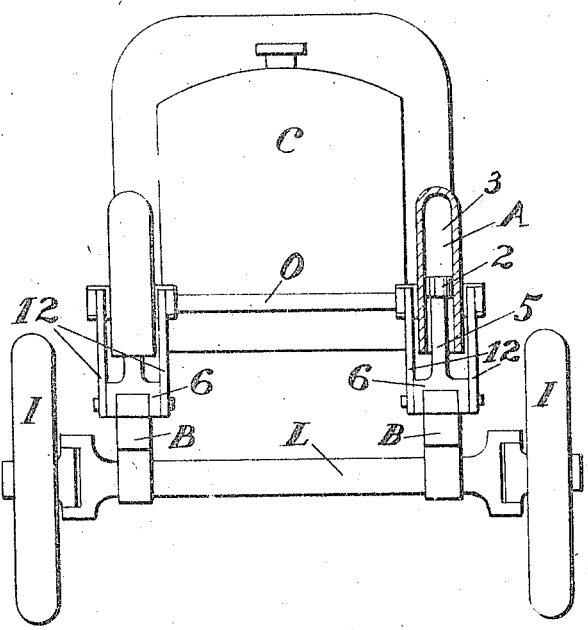

Figure 1 is a vertical side view showing diagrammatically one embodiment of my invention. Fig. 2 is a vertical front view. Fig. 3 is a vertical side view of a second embodiment of my invention. Fig. 4 is a horizontal view. Fig. 5 is a vertical front view. Figs. 1 and 2 are two views relating to one embodiment of my invention. They show two views of the suspension of a vehicle, both views being at right angles one to the other.

L is an axle of a vehicle, I a wheel, K a shackle holding one of the extremities of spring B, A is a diagrammatic illustration of a standard means of suspension known as "air springs", which essentially comprise a piston tube compressing a gas in chamber 3, O is a rigid shaft carrying gear wheels 4 at either end, these wheels 4 engaging in the rack carried by piston rod 5, C is a vehicle body, 6 is a swivel joint connecting spring B with piston rod 5.

It will be seen that up and down motions are taken care of by air springs A, A and by the resiliency of springs B, B, and that the rolling motion is taken care of by B, B only. Shaft O allows air springs A, A to work only for displacements of the vehicle body approximately parallel to the axle L. Springs B, B can therefore be made as stiff as necessary to give a desirable stability to the vehicle and air springs A, A can be made as soft as desirable to give, in combination with springs B, B, an easy up and down motion to the vehicle. It is possible to give to gears 4, 4 and racks 5, 5 a sufficient amount of backlash to use the air springs A, A for softening the rolling motion of the vehicle body up to a limit, controlled by said amount of backlash, thus permitting the small amplitude of rolling motion to be taken care of by soft springs, a greater amplitude being opposed by a stiffer spring action. This last spring action begins at the instant the backlash is overcome.

In Figs. 3 and 4 I have used the same lettering and numerals for corresponding parts as refers to Figs. 1 and 2.

Instead of using a geared equipment, I use links, which links are an equivalent of the gearing used in the embodiment of my invention shown in Figs. 1 and 2.

Lever 10 is connected to shackle 12. When lever 10 is pushed upward by shackle 12, shaft O, O rotates in bearings 11.

It will be seen that for up and down motions of the vehicle, when shaft O remains substantially parallel to axle L the air springs will operate freely. For rolling motions shaft O will not rotate, as the efforts transmitted by lever 10 and shackle 12 are in opposite directions.

By means of my invention it will be seen that the stiffness of the air springs can be made as great as desirable without increasing the rolling motion of the vehicle above the desired limit which is thought necessary to have a stable vehicle.

I claim—

1. In a vehicle suspension a resilient equipment comprising springs and air springs working in combination, a transverse rotary shaft geared at its extremities with the moving element of the air springs.

2. In a vehicle suspension a resilient equipment comprising springs and air springs working in combination, a transverse rigid shaft geared to the moving elements of the air springs adapted to rotate for simultaneous displacement of the moving elements of the air springs.

3. In a vehicle suspension comprising springs and air springs working in combination, a rotary shaft connected to the reciprocating parts of the air springs located respectively on the right and left hand sides of the vehicle, and means to rotate said shaft in one direction for upward motions of the reciprocating parts of the air springs and to rotate said shaft in an opposite direction for downward motions of the reciprocating parts of the air springs.

4. In a vehicle suspension a spring equipment working in combination with an air spring equipment located on the right hand side of the vehicle, a similar spring equipment working in combination with an air spring equipment located on the left hand side of the vehicle, a rotary shaft mechanically connected to the right and left hand side air spring equipments, and means to rotate said shaft controlled by the up and down motions of the reciprocating parts of the air spring equipments.

5. In a vehicle suspension a resilient equipment working in combination with air springs, said air springs being located respectively on the right and left hand sides of the car, a rotating shaft mechanically connected to said air springs and means to transform the up and down motion of the reciprocating parts of the air springs into a rotary motion of said shaft.

6. In a vehicle suspension comprising air springs, means to substantially equalize the displacements of the reciprocating parts of the air springs located respectively on the right and left hand sides of the vehicle.

7. In a vehicle suspension comprising air springs, means responsive to the up and down motion of the vehicle controlling the displacements of the reciprocating parts of the air springs located respectively on the right and left hand sides of the vehicle.

In witness whereof I have hereunto subscribed my name this 21st day of May, 1915.

CHARLES H. SMOOT.

Witnesses:
C. S. BROOKS,
L. L. BATTU.